US012775308B2

(12) United States Patent
Zhang et al.

(10) Patent No.: US 12,775,308 B2
(45) Date of Patent: Oct. 27, 2026

(54) PROTECTIVE STRUCTURES FOR COMPUTER DONGLES

(71) Applicant: JACS Solutions, Linthicum Heights, MD (US)

(72) Inventors: Chang-Gang Zhang, Escondido, CA (US); Xiaotian Wu, Eldersburg, MD (US)

(73) Assignee: JACS Solutions, Linthicum Heights, MD (US)

( * ) Notice: Subject to any disclaimer, the term of this patent is extended or adjusted under 35 U.S.C. 154(b) by 125 days.

(21) Appl. No.: 18/666,316

(22) Filed: May 16, 2024

(65) Prior Publication Data

US 2024/0385653 A1 Nov. 21, 2024

Related U.S. Application Data

(60) Provisional application No. 63/502,535, filed on May 16, 2023.

(51) Int. Cl.

*G06F 1/16* (2006.01)
*H01R 13/621* (2006.01)
*H01R 13/627* (2006.01)

(52) U.S. Cl.

CPC ......... *G06F 1/1656* (2013.01); *H01R 13/621* (2013.01); *H01R 13/6273* (2013.01); *G06F 2200/1639* (2013.01); *H01R 2201/04* (2013.01); *H01R 2201/06* (2013.01)

(58) Field of Classification Search

CPC ..... G06F 1/1601; G06F 1/1628; G06F 1/1629
See application file for complete search history.

(56) References Cited

U.S. PATENT DOCUMENTS

| | | | | |
|---|---|---|---|---|
| 9,360,891 | B1 * | 6/2016 | Van Der Merwe | G06F 1/1616 |
| 11,031,968 | B1 * | 6/2021 | Miller | G06F 1/1679 |
| 2008/0146265 | A1 * | 6/2008 | Valavi | A61B 5/002 455/550.1 |
| 2008/0166902 | A1 * | 7/2008 | Johnson | H01R 13/6658 439/133 |
| 2013/0060517 | A1 * | 3/2013 | Sanchez | H01Q 3/04 324/207.2 |
| 2016/0381819 | A1 * | 12/2016 | Glaser | H05K 5/03 361/679.01 |
| 2017/0196327 | A1 * | 7/2017 | Ma | G06F 1/1626 |
| 2017/0346229 | A1 * | 11/2017 | Cheng | H01R 24/62 |
| 2018/0121906 | A1 * | 5/2018 | Browand | G06Q 20/353 |
| 2020/0235538 | A1 * | 7/2020 | Liao | H01R 25/006 |
| 2020/0285819 | A1 * | 9/2020 | Haertel | G06K 7/10316 |
| 2025/0208653 | A1 * | 6/2025 | Vanwaeyenberghe | G06F 1/1629 |

* cited by examiner

*Primary Examiner* — Anthony Q Edwards
(74) *Attorney, Agent, or Firm* — BakerHostetler

(57) ABSTRACT

A system and multiple hardware structures to provide secure, anti-disassembly, anti-tamper and uninterrupted network connection between laptop computer and wireless networks. An anti-disassembly structure may include a locking arm having a rear end fixed to a side of a plug, and a front end having an outwardly biased latch projection. When the plug is inserted into a socket, the locking arm inserts into a corresponding slot on a side of the socket. A front end of the locking arm may be bent inward, and the latch projection may extend into a lock hole on the side of the slot to complete the locking. Additional protective and tamper resistant features may be included, such as anti-assembly screws, waterproofing, and protective enclosures with shock resistance.

16 Claims, 18 Drawing Sheets

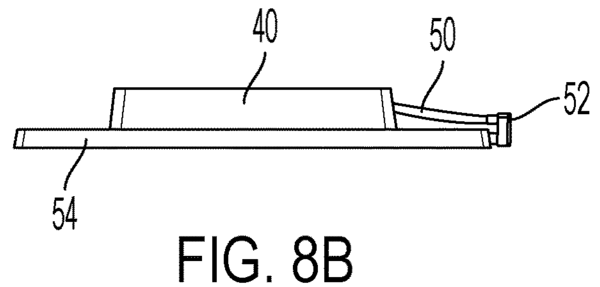
FIG. 8B
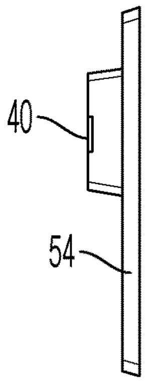
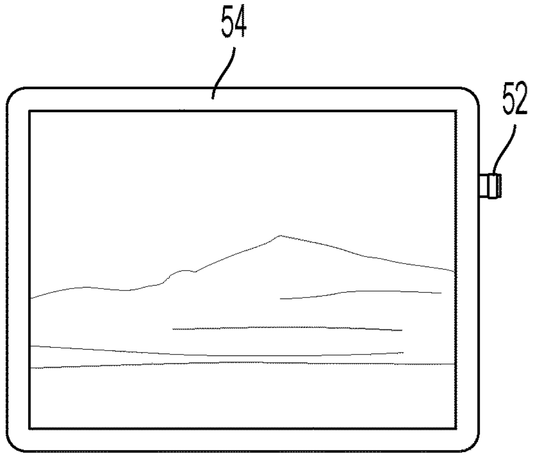
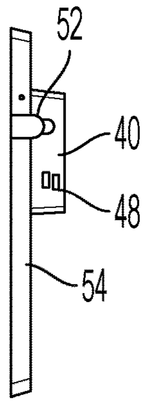
FIG. 8D FIG. 8A FIG. 8E
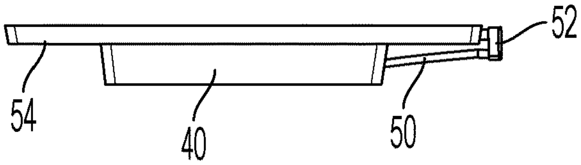
FIG. 8C
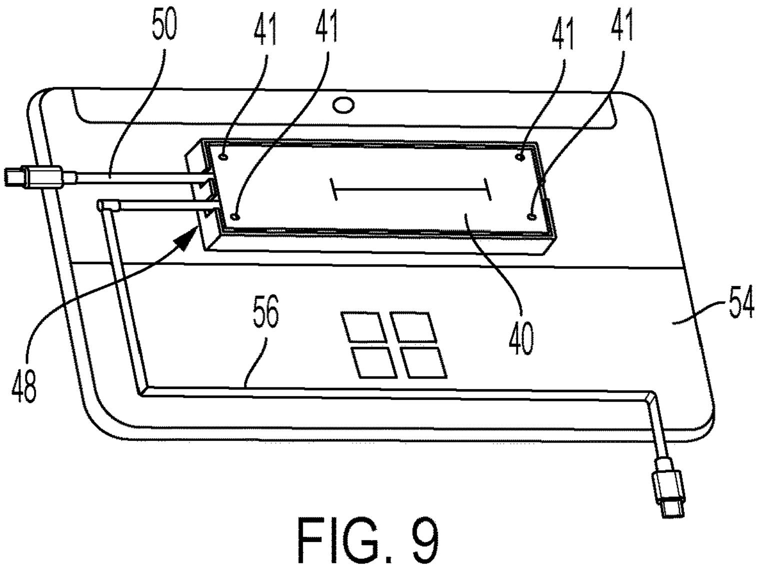
FIG. 9

PROTECTIVE STRUCTURES FOR COMPUTER DONGLES

CROSS-REFERENCE TO RELATED APPLICATIONS

The present application claims priority to U.S. Provisional Application No. 63/502,535, filed May 16, 2023, which is incorporated herein by reference.

TECHNICAL FIELD

The current disclosure relates to the field of computer hardware mechanics, and more specifically multiple embodiments and structures of external devices providing secure, uninterrupted, anti-tamper, anti-disassembly cellular communication links between computers and networks.

BACKGROUND

Typically, a computer/laptop/tablet can be connected to various external devices, such as display, keyboard, mouse, storage device, speaker, printer, camera, scanner, etc. physically. In other words, they are connected to the computer host through a peripheral interface to form a communication/electrical connection. The most common structure of the peripheral interface is the plug and socket, which are manually inserted or pulled out to connect or disconnect the external device.

The firm, secure, anti-tamper connections for interfaces such as displays, keyboards, and mice are particularly important in many industrial applications. Otherwise, accidental loosening or external force impact on interface can directly cause loss of connections. For instance, certain applications like kiosk machines installed in public service areas, their externally connected devices often require anti-theft protection structure to insure secured connections. Further in school education scenarios, students commonly equipped with laptops or tablets with built-in WiFi connections, external cellular connection devices can be attached via USB interfaces to add access to public cellular networks for distant learning activities. For this kinds of applications, external cellular connection devices need to be securely attached to laptops or tablets, specifically an anti-disassembly structure is needed to prevent students from removing external devices off from their computers.

A USB dongle may be a device with cellular communication (or other wireless network access) modem, RF (or other wireless data) transmit/reception components and male USB interface. USB dongles are commonly used devices to provide cellular and/or wireless network connectivity to computers and many industrial machines. Typically, a USB dongle is inserted into a USB interface socket of a computer to form a communication link between computer and cellular networks. This type of connection is subject to damage, connection interruption, and tamper caused by various reasons such as vibration, shock, drop, external forces, and man-made errors, etc. As matter of factor, it becomes a serious issue in school use case where students use USB dongles directly inserting into computers or mobile hotspot to get internet connections via cellular networks for their WiFi based computers, such as largely deployed Chromebook, Surface-book, etc., but mishandling, damage, lost, configuration difficulty are major issues experienced for large scale deployed computers in schools. No good solutions have been developed to fix the issue. The ultimate solution is to have all computers and other related machine to have integrated cellular modem built-in. However, such solution is more expensive in one hand, and would not solve the problem for largely deployed WiFi computers on the other hand. There has been a big effort from educational market to seek cost effective solutions to fix this problem for school deployment.

Besides above-mentioned problem in educational use case, other industrial verticals such as mining, oil and gas, utility, construction, etc., require similar solution for cost effective cellular network connection.

For the purpose of the current disclosure a "dongle" is a piece of hardware (such as computer hardware) that connects to a port on another device (such as a computer device or an appliance) to provide it with added functionality or enable a passthrough to a device that adds functionality. Likewise, a "computer dongle" is a small device able to be connected to and used with an interface port (such as a USB port, a Lightning port, and HDMI port and the like) on a computer (such as a laptop, tablet, smartphone, smart-pad, smart television or display, computerized appliance and the like), such as to allow access to wireless broadband or use protected software. A USB dongle is a computer dongle with a USB interface/plug for a corresponding USB port on a computer.

RELATED ART

A USB dongle may provide a device with cellular communication modem, RF transmit/reception components and male USB interface. USB dongles are commonly used devices to provide cellular connectivity to computers and many industrial machines. Typically, a USB dongle is inserted into a USB interface socket of a computer to form a communication link between computer and network as shown in Prior Art FIGS. 25A and 25B.

This type of connection is subject to damage caused by vibration, shock, drop, external forces, and man-made errors such as tamper, disassembly, etc. It becomes a serious issue in school use case, and no good solutions have been developed to fix the issue.

Another popular way of connecting computer to cellular networks is to use mobile hotspot devices which have built in modem to provide cellular connections to computers via WiFi as it is shown in Prior Art FIG. 26.

However, this type of connection is shared with multiple users, rather for individual user. The connections require configuration management and not user friendly for school student use cases. Further, the mobile hotspot devices are subject to damage and loss in school environments.

The ultimate solution is to have all computers and other related machine to have integrated cellular modem built in. Such a solution is more expensive, and low penetration rate, about 5%-10% of laptop computers have built in cellular modem. More importantly, this will not solve issue for largely deployed WiFi computers with said low penetration rate. There has been a big effort from educational market to find cost effective solutions to fix this issue for school deployment. The current disclosure proposes a system and structures to provide secure, uninterrupted, anti-tamper, anti-disassembly cellular communication links between computers and networks, and therefore this disclosed system and structures with multiple embodiments solve the problem cost effectively.

For certain industrial use cases, typically laptop computers are specially designed and build with ruggedization standards, and cellular modems are also pre-integrated, since insertion of an external modem or dongle would compromise ruggedized standards. Such specially manufactured computers are usually twice more expansive than regular computers. The current disclosure also contains one embodiment which provides an cost-effective solution to this problem.

SUMMARY

Embodiments of the current disclosure provide a system and multiple hardware structures to provide secure, anti-disassembly, anti-tamper and uninterrupted cellular connectivity to computers and other machines, and thus solve the problem for school deployment.

The disclosed system currently comprises seven exemplary (and non-limiting) hardware structures or embodiments. In the embodiment No. 1, an external device is designed as a USB dongle enclosure structure with a L shaped head in front, which is connected to the computer via a USB interface. The USB dongle enclosure structure includes a protective enclosure for the USB dongle, a USB plug that extends out of the front end of the enclosure, and a USB cable (and/or wiring or circuitry) that passes through the enclosure to connect to the USB dongle inside. The enclosure is securely mounted to a computing device (such as a laptop or a tablet computer). The L-shaped head extends out from the enclosure and includes a male USB connector at the distal end that is inserted into a female USB connector/socket on the computing device, where the L-shaped head further contains interface structure, wiring, circuitry and so forth for providing a data and power connection between the male USB connector at the distal end and the USB dongle secured within the enclosure.

In the embodiment No. 2, the system and structure are designed with a protective enclosure that encloses within a USB type A dongle, a circuit board, a USB type C L shaped male connector with cable, and a charging interface. The circuit board is designed to split a USB type A interface into two interfaces, one for data communication with computer via type C interface and the other for charging. The enclosure is securely mounted on a computing device, such as a laptop computer. A type C charging cable is connected to the charging port at one end, and a power source at the other end.

In the embodiment No. 3, the system and structure is an enclosure integrated with a computer protection case which provides for a USB type A dongle, a circuit board, a USB type C L shaped male connector. The case is securely attached to a laptop computer to ensure undisrupted wireless connection and to achieve anti-tamper objectives.

In the embodiment No. 4 the system and structure is an enclosure integrated with a protection case for series of computers, it has a USB type A dongle, an circuit board which is designed to split a USB type A interface into two, one for data communication with computer via type C interface and the other for charging, a USB type C L shaped male connector and a USB type C charging interface.

The embodiment No. 5 of the solution is an enclosure integrated with a protection case specially for iPad series of computers, it has a USB type A dongle, a circuit board, an L shaped male connector with a USB C interface. The dongle and associated circuit are designed not to be visible by user.

The embodiment No. 6 of the solution is designed with a protection case and integrated enclosure, the case is specially designed to have an integrated USB type A dongle, a type A to type C connector with cable, and wireless charging pad, the case is securely attached to a laptop computer to ensure undisrupted wireless connection.

The embodiment No. 7 of the solution is designed with system and structure with which the computer stand is specially designed to host a USB type A dongle, a type A to type C connector with cable, when the computer is securely attached to the stand and undisrupted wireless connection can be established and maintained.

The embodiment No. 8 of the solution is designed with a ruggedized case with an integrated enclosure. Here, the case and the enclosure are together purposely designed with extra protection which meets similar industrial standards to that of ruggedized computers. More specifically, the computer case is specially designed to have an integrated USB type A dongle and a type A to type C connector, with the cable contained inside of the enclosure. The enclosure may be attached to the case without compromising ruggedization standards, and the entire structure may be securely attached to a laptop computer to ensure undisrupted wireless connection. The embodiment therefore is capable of providing ruggedized protection.

In summary, cellular modem-based USB dongles are common devices used to get access to cellular networks for computers and other machines. A proposed novelty in this disclosure is to create multiple hardware structures which integrate dongles with other components to provide secure, uninterrupted, anti-tamper, anti-disassembly cellular communication links between computers and networks.

BRIEF DESCRIPTION OF THE DRAWINGS/FIGURES

FIG. 8 provides multiple views of embodiment No. 2 as mounted to a computing device. FIG. 8A is a front view, FIG. 8B is a top view, FIG. 8C is a bottom view, FIG. 8D is a left side view and FIG. 8E is a right side view.

Figure 10:
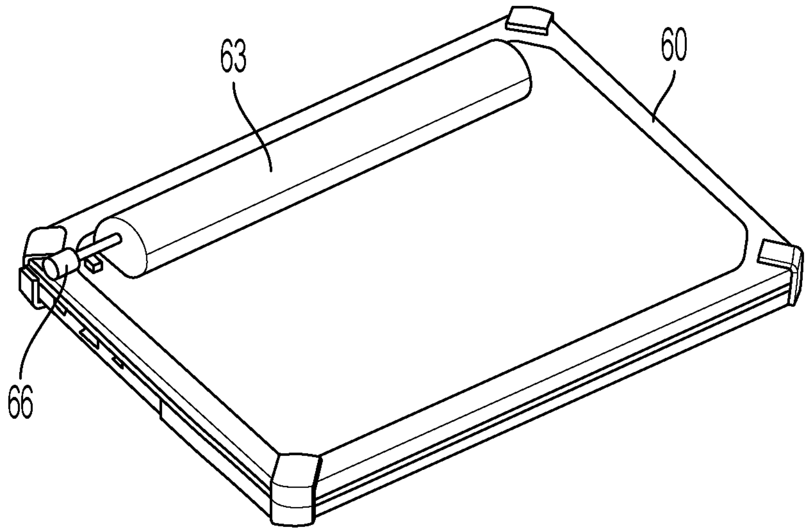

FIG. 9 is a perspective view of an implementation of embodiment No. 2 of the disclosed system and anti-disassembly structure when charging is supported FIG. 10 provides a perspective view of embodiment No. 3 according to the current disclosure.

Figure 11A:
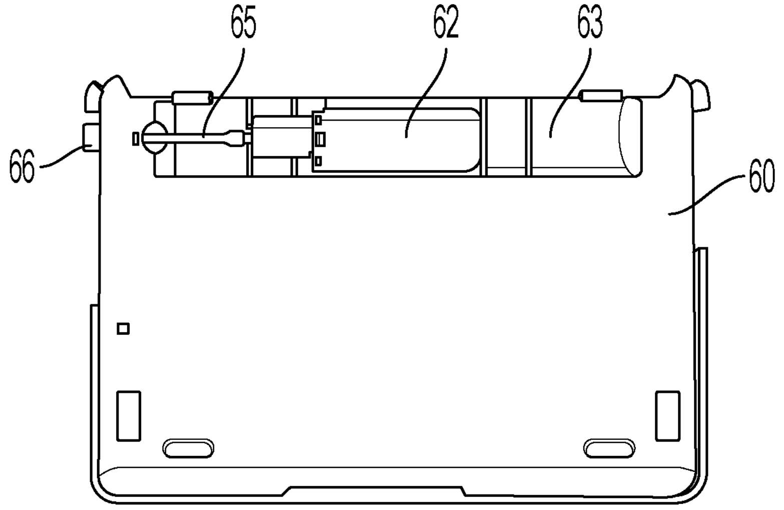

FIG. 11A provides a detailed interior view of an example of embodiment No. 3 according to the current disclosure.

Figure 11B:
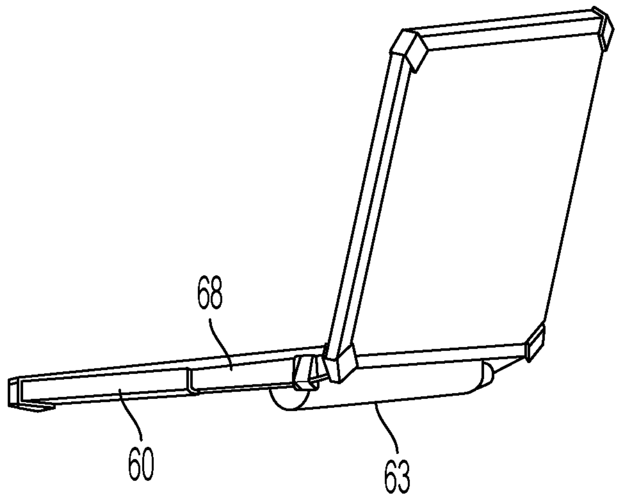

FIG. 11B provides a perspective view of the example of FIG. 11A.

Figure 12A:
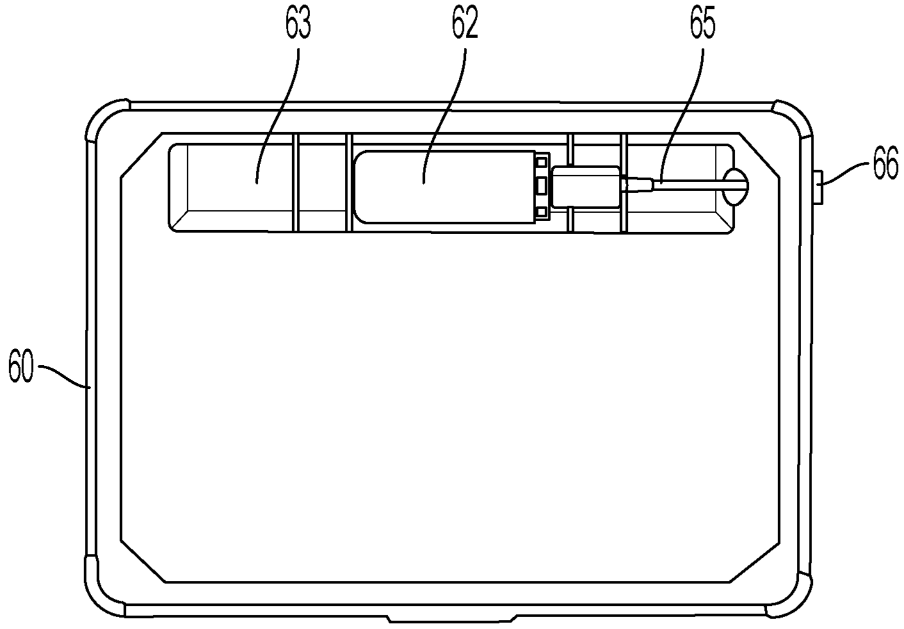

FIG. 12A provides a detailed interior view of another example of embodiment No. 3 according to the current disclosure.

Figure 12B:
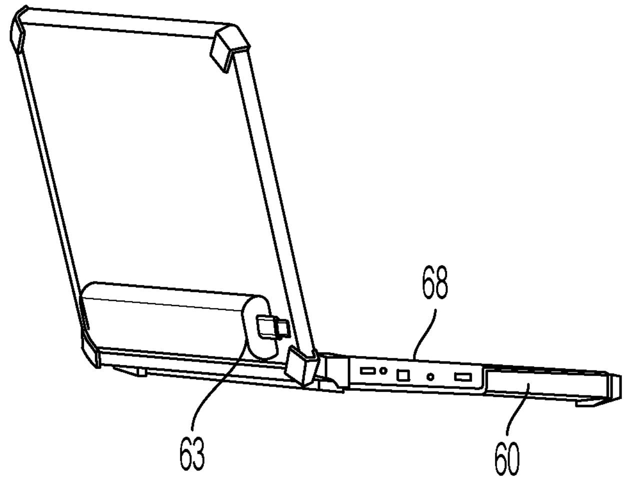

FIG. 12B provides a perspective view of the example of FIG. 12A.

Figure 13A:
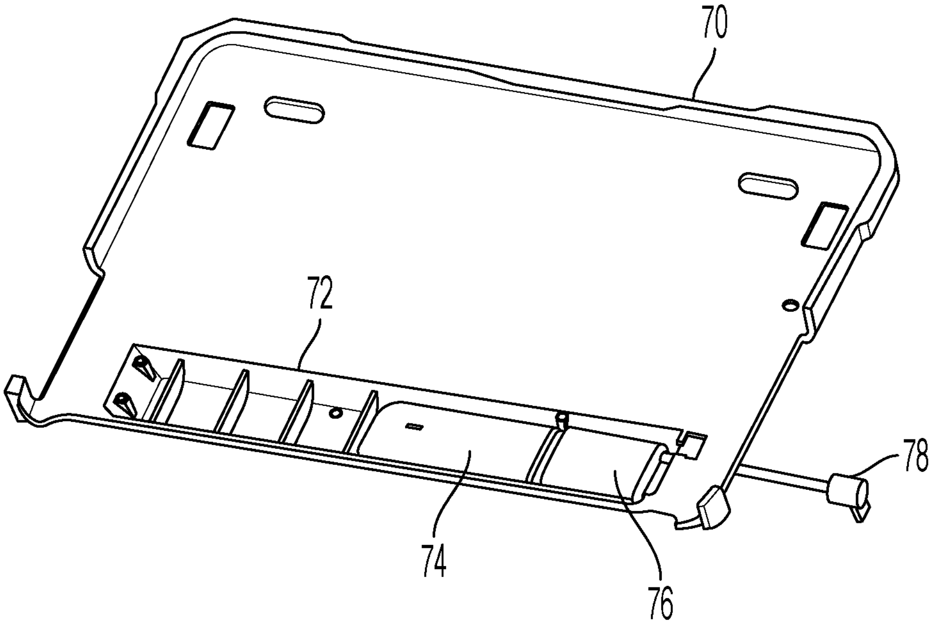

FIG. 13A provides a perspective (open) interior view of an example of embodiment No. 4 of a protection case with integrated dongle enclosure supporting a charging interface.

Figure 13B:
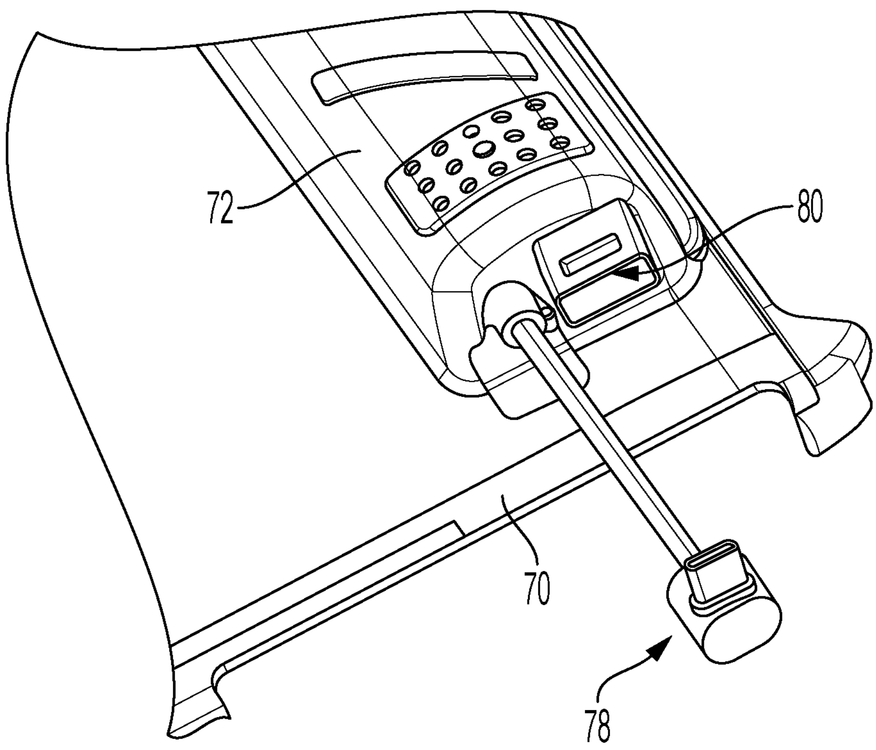

FIG. 13B provides a close-up, perspective view of the example of FIG. 13A with some components shown as transparent.

Figure 13C:
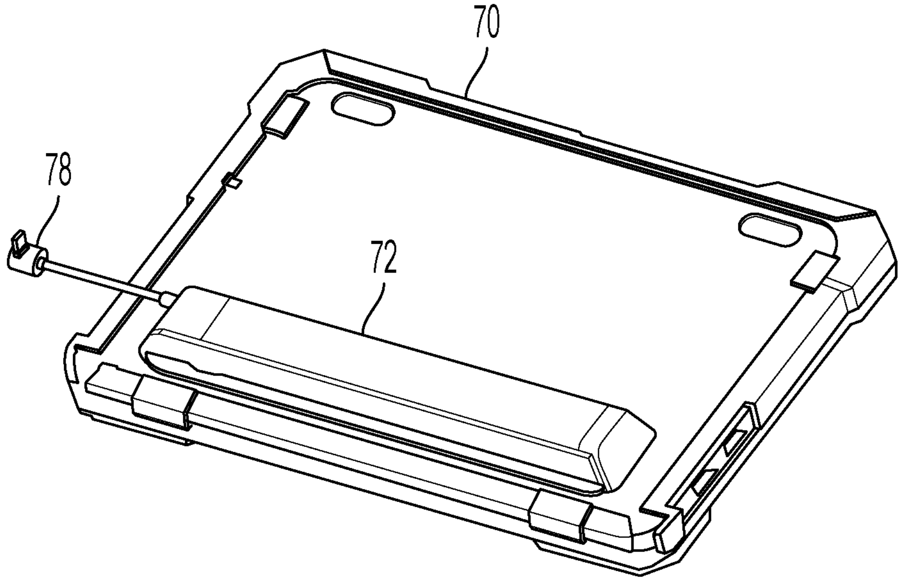

FIG. 13C provides a perspective exterior view of the example of FIG. 13A-B.

Figure 13D:
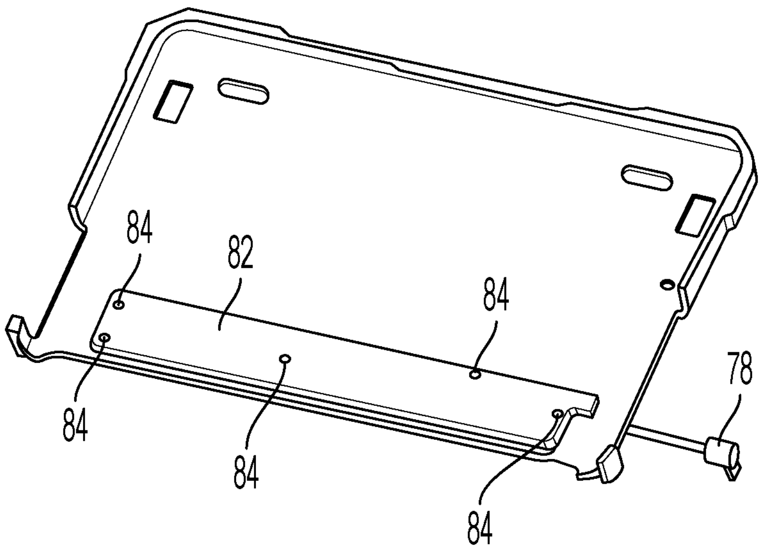

FIG. 13D provide a perspective (closed) interior view of the example of FIG. 13A-C.

Figure 13E:
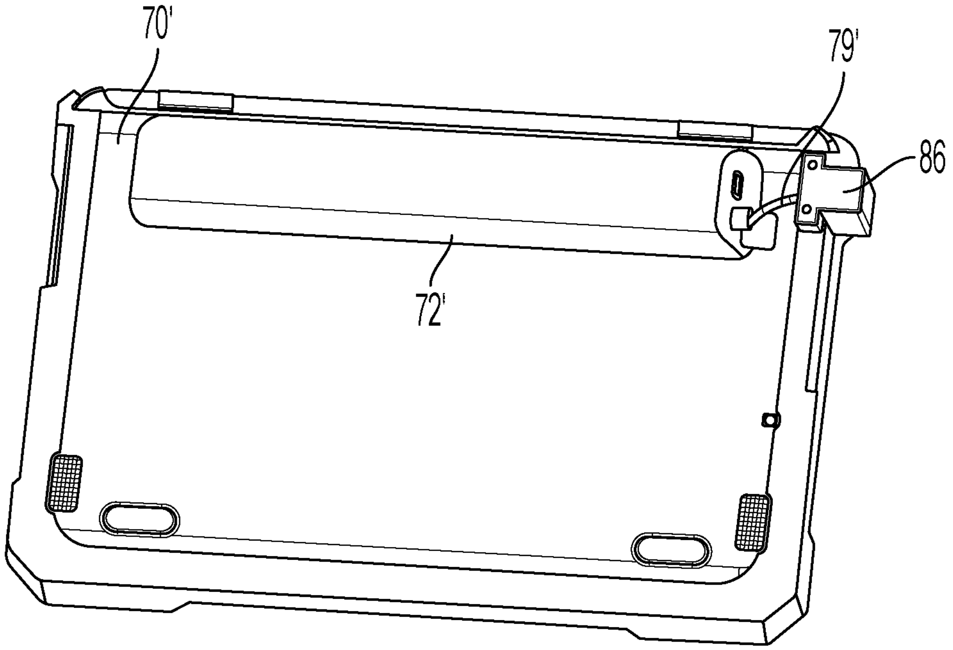
Figure 13F:
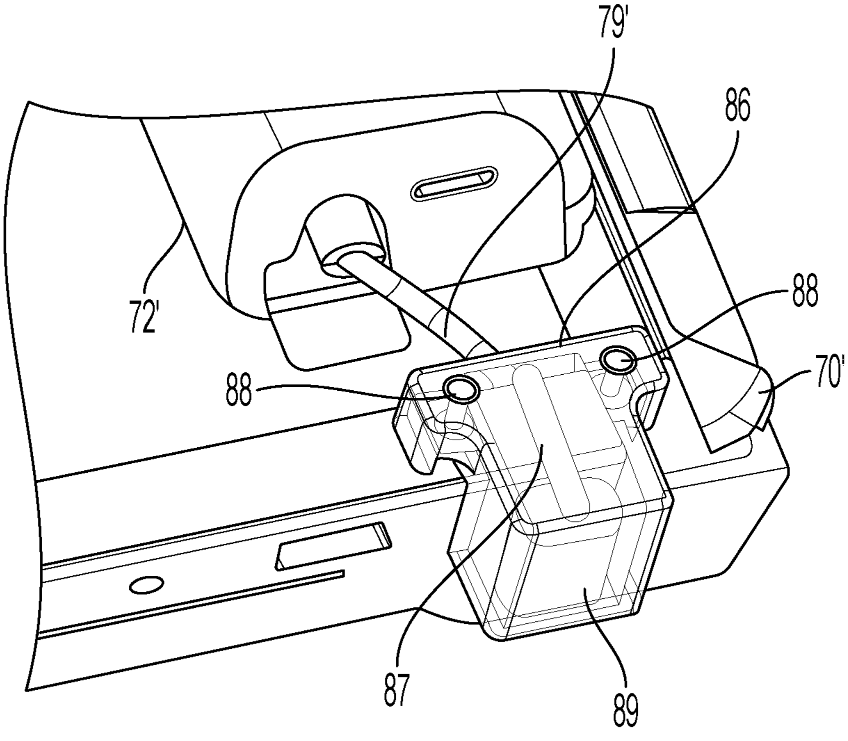

FIGS. 13E and 13F provide detailed perspective views of an enhanced design alternate of embodiment No. 4 in which the dongle chamber is further extended towards computer USB port location and a small protection enclosure is added to lock USB plug/socket connection for improved protection.

Figure 14A:
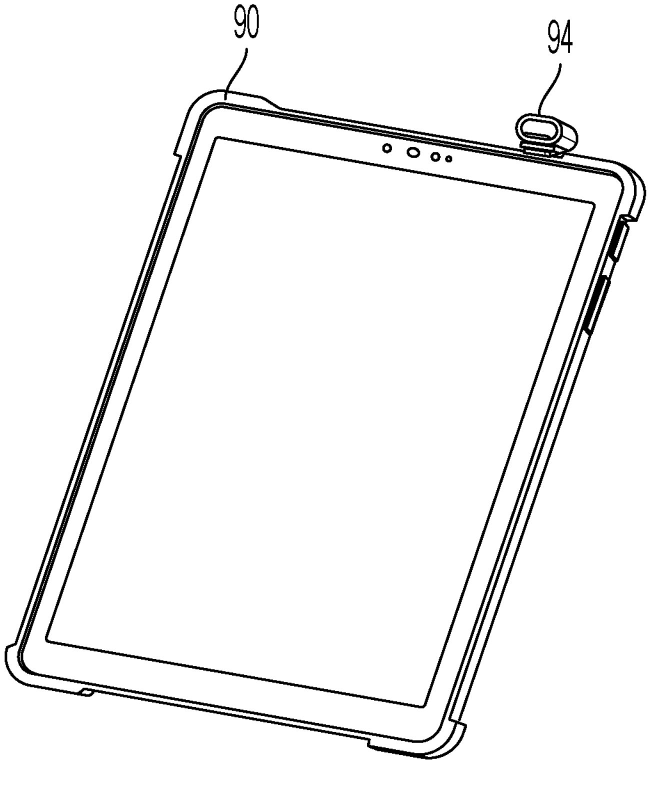

FIG. 14A provides a front perspective view of embodiment No. 5 protection case with integrated dongle for iPad computers.

Figure 14B:
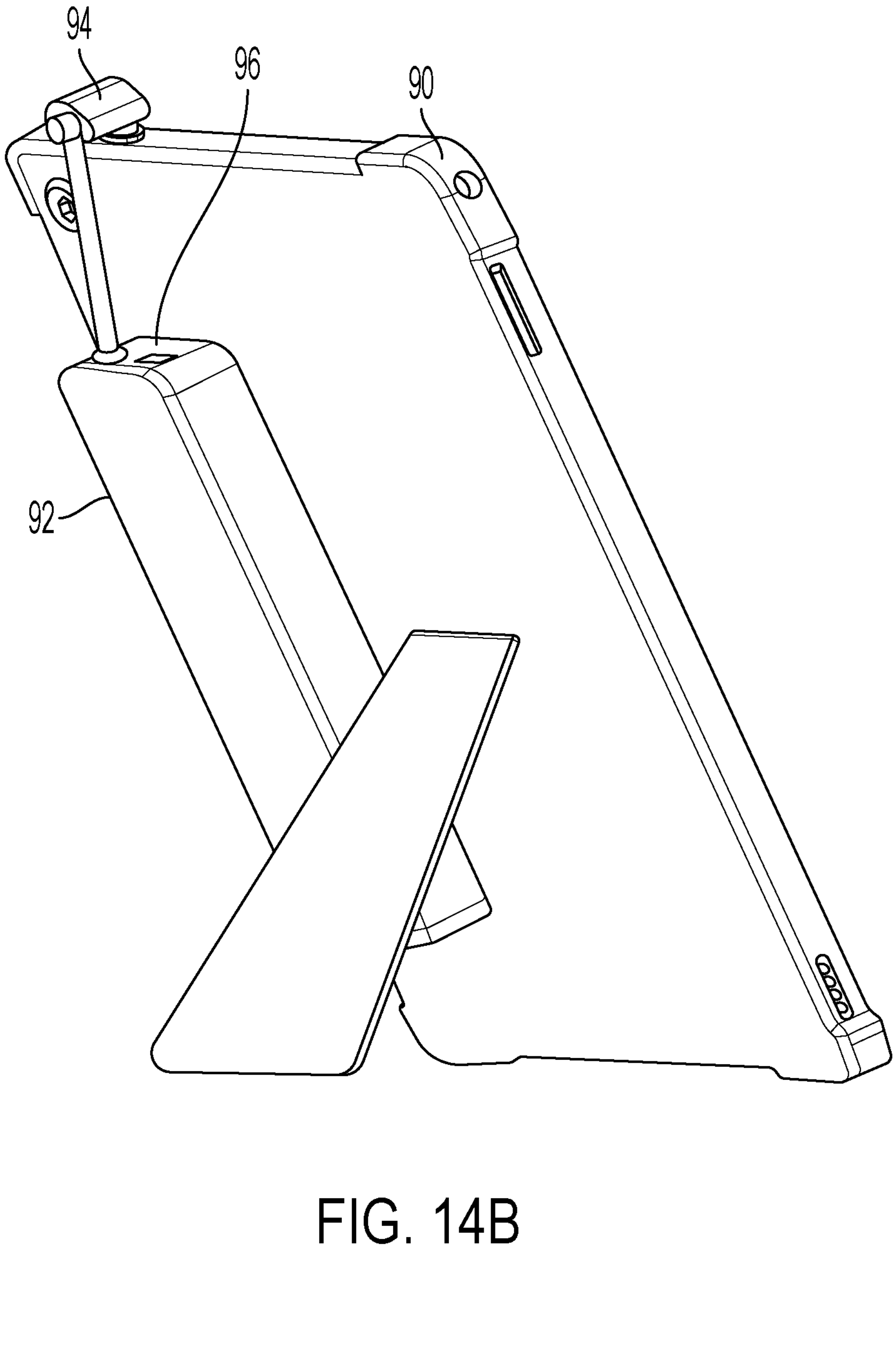

FIG. 14 B provides a rear perspective view of the embodiment of FIG. 14A.

Figure 15:
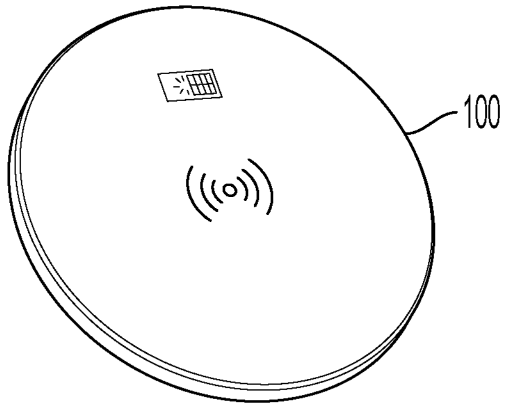

FIG. 15 provides a perspective view of embodiment No. 6 wireless charging pad that may be integrated with Embodiment Nos. 3, 4 or 5, for example.

Figure 16A:
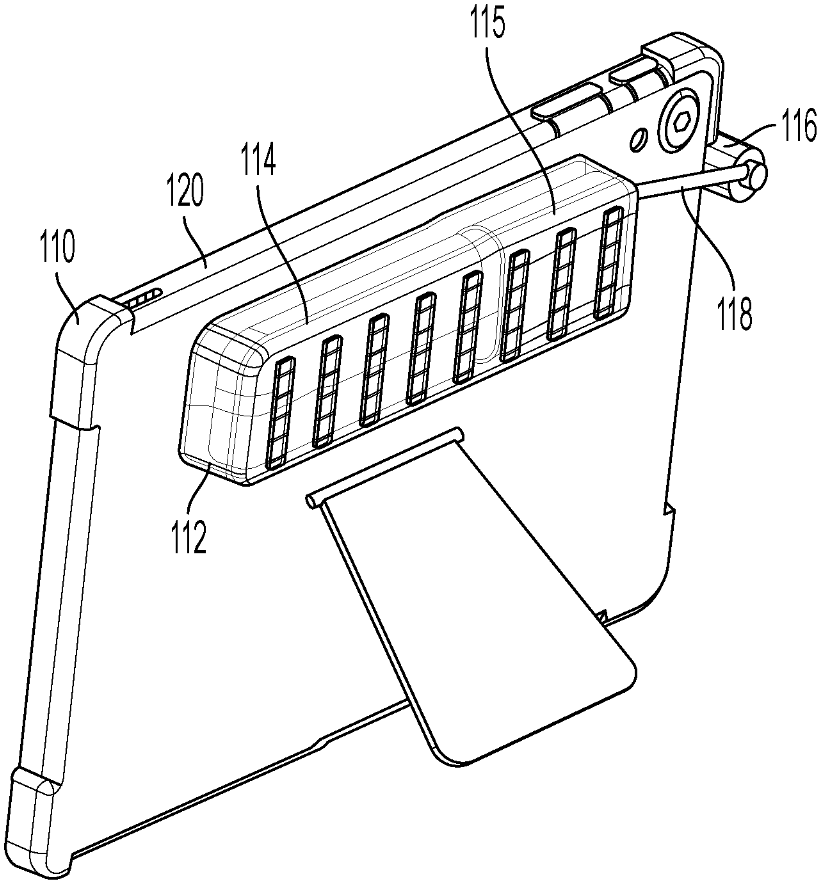

FIG. 16A provides a rear perspective view of embodiment No. 7 tablet stand with integrated USB dongle to provide cellular connectivity with some elements show as transparent.

Figure 16B:
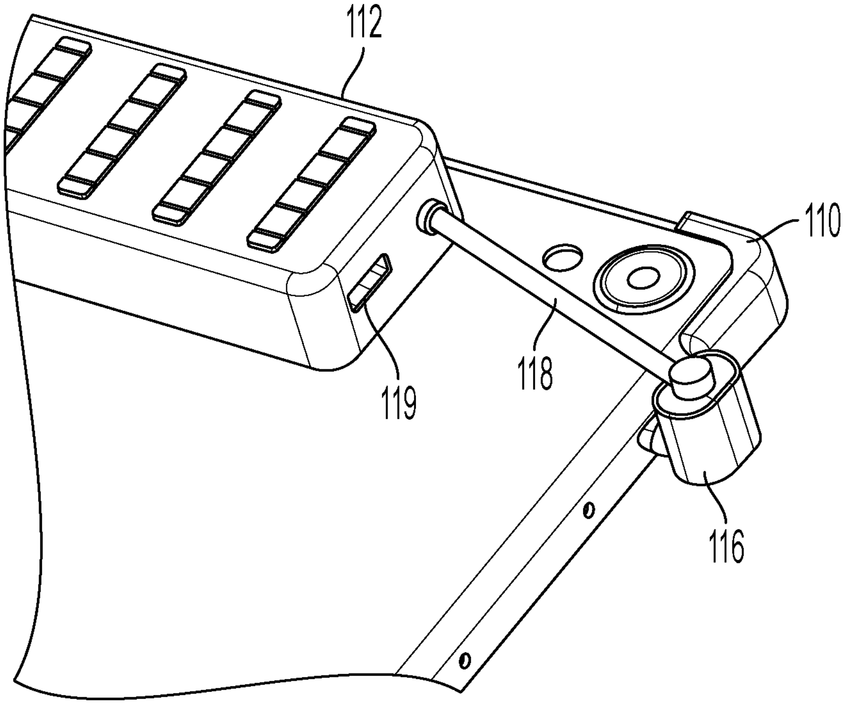

FIG. 16B provides a close-up perspective view of the embodiment of FIG. 16A.

Figure 16C:
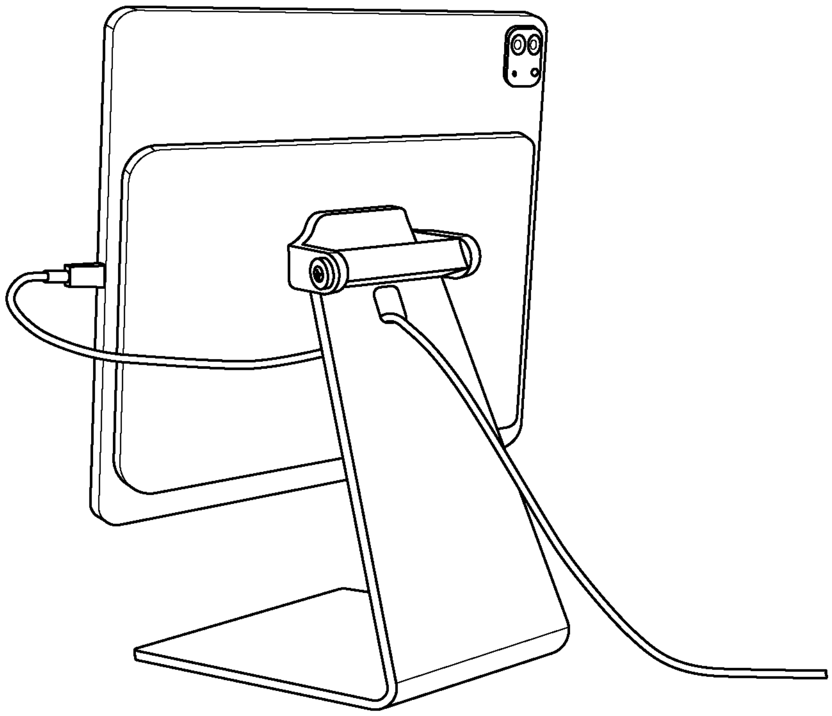

FIG. 16C provides a comparison of the prior art computer stand and dongle with the embodiment No. 7 in FIG. 16A.

Figure 17A:
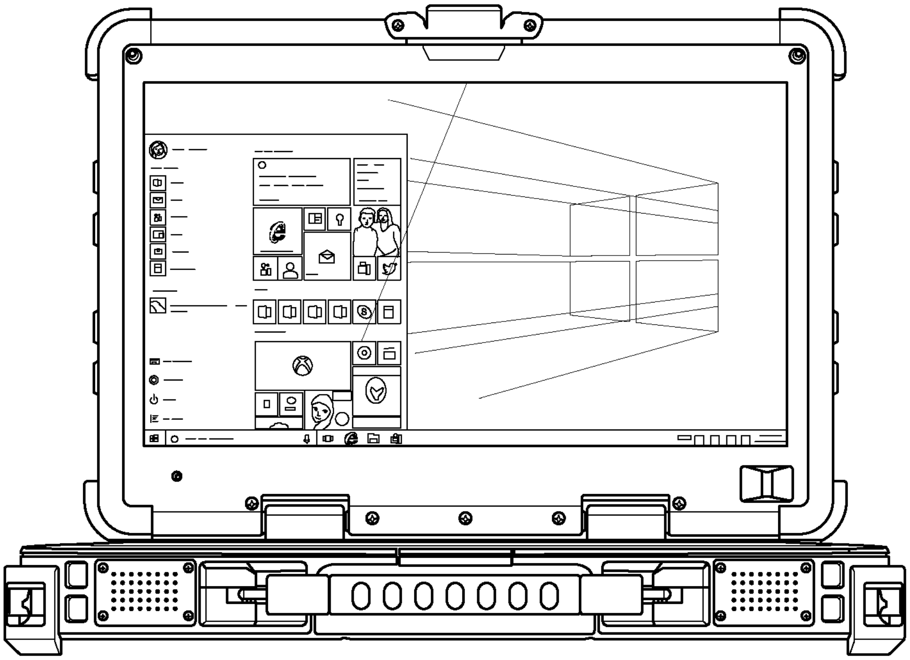

FIG. 17A provides an example computer which is fully ruggedized with embedded cellular modem.

Figure 17B:
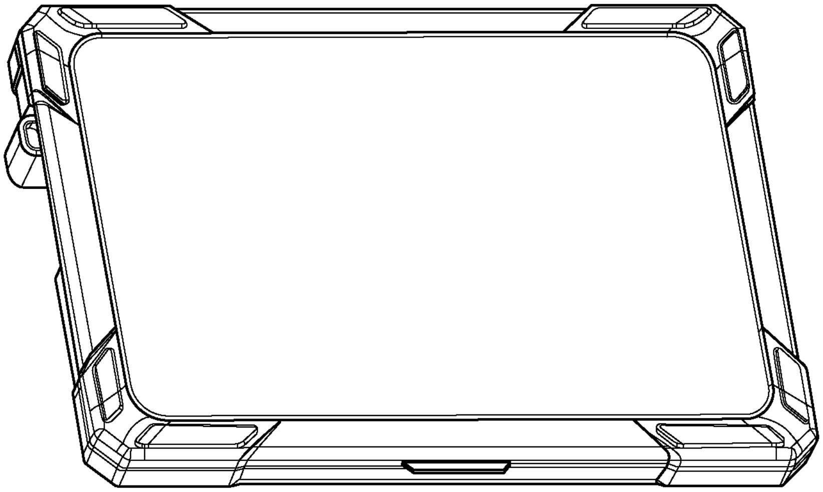

FIG. 17B provides a top perspective view of embodiment No. 8, wherein a laptop is attached with a ruggedized protection case with integrated cellular dongle.

Figure 17C:
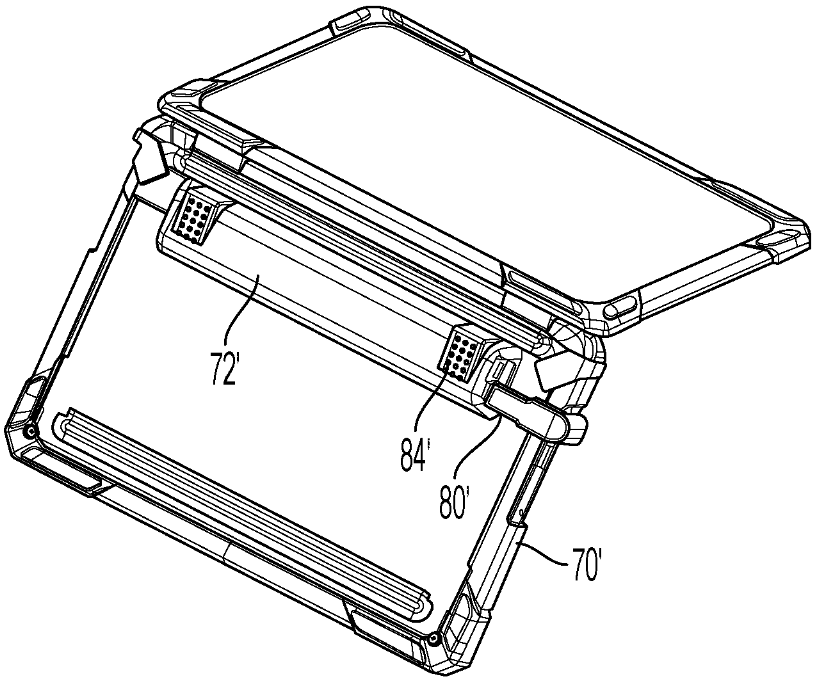

FIG. 17C provide a side perspective view of embodiment No. 8, wherein a laptop is attached with a ruggedized protection case with integrated cellular dongle.

Figure 17D:
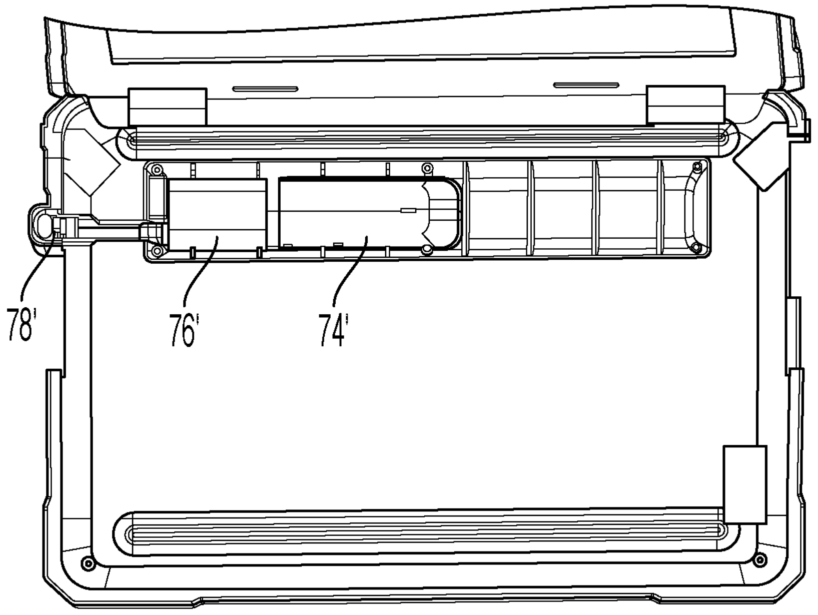

FIG. 17D provide a bottom perspective view of embodiment No. 8, wherein a laptop is attached with a ruggedized protection case with integrated cellular dongle.

Figure 18A:
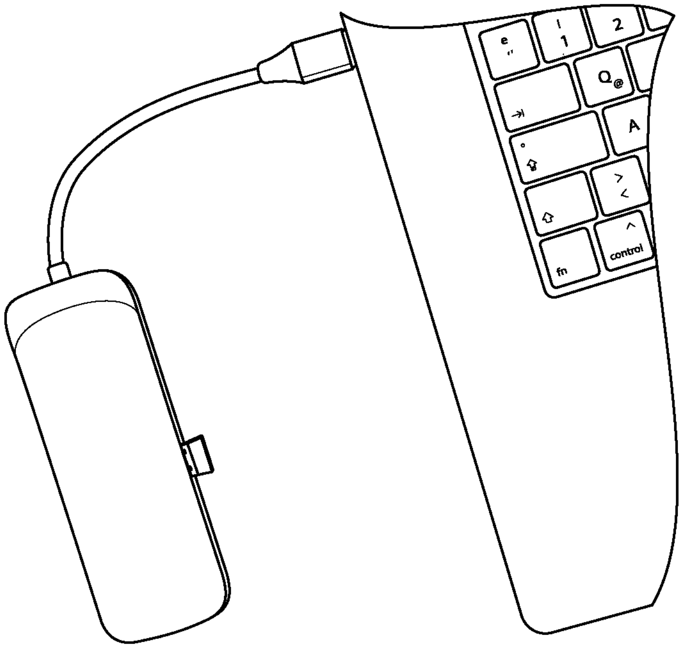
FIG. 18A PRIOR ART

FIG. 18A provides a prior art example of a USB dongle connected to a computer socket.

Figure 18B:
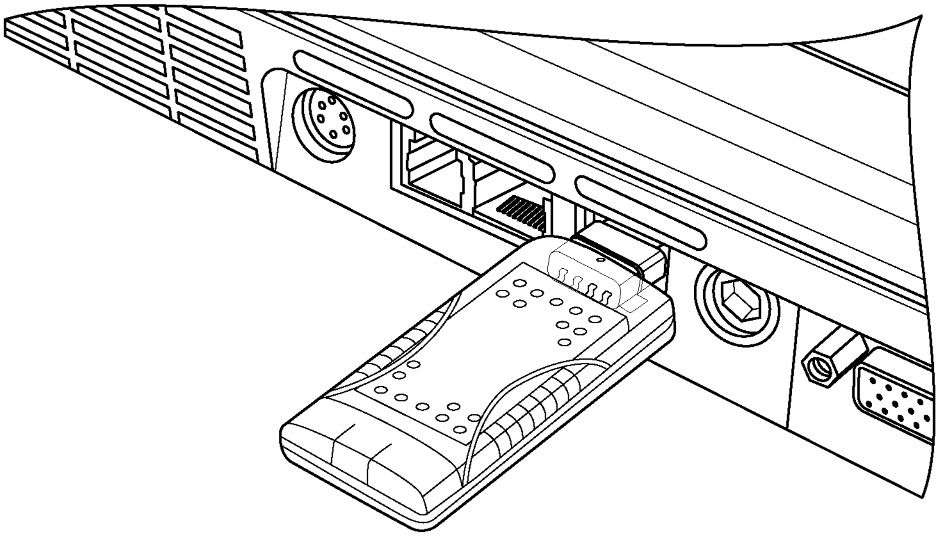
FIG. 18B PRIOR ART

FIG. 18B provides another prior art example of a USB dongle connected to a computer socket.

Figure 18C:
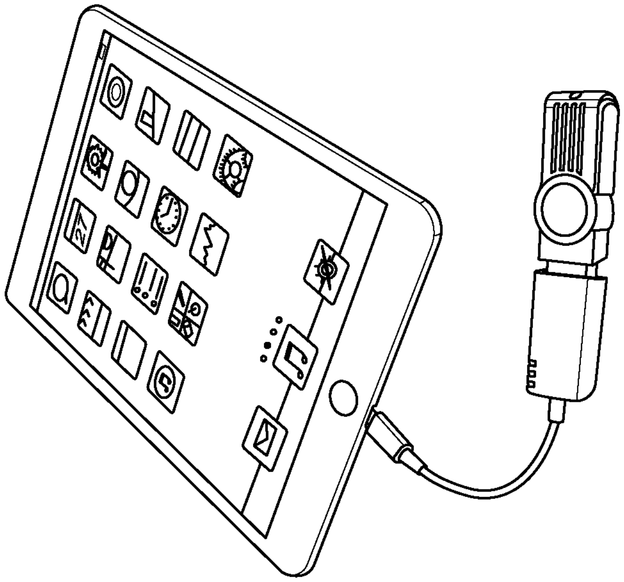
FIG. 18C PRIOR ART

FIG. 18C provides a prior art example of a USB dongle connected to a tablet.

Figure 19:
FIG. 19 PRIOR ART

FIG. 19 provides an example of a mobile hotspot connected to devices.

DETAILED DESCRIPTION

In reference to FIGS. 1 to 5, FIGS. 1 to 3 show an embodiment No. 1 of the current disclosure. In this embodiment, the external device is a USB dongle enclosure structure 36 with a L shaped head 30 in front, which is connected to the computer 32 via a USB interface. L-shaped head 30 includes an external shell 8, a USB plug 1 that extends out of the front end of the shell 8, and a USB cable (circuitry or other wiring) that passes through the shell 8 to connect the USB plug 1 to the USB dongle 34 within the enclosure structure 36 for data and power. For ease of explanation, the direction in which the plug points to the computer's USB socket is considered the front, and the plug axis is considered the inner side.

The embodiment No. 1 of the solution is designed to use an external device as shown in FIGS. 1-5.

Figure 1:
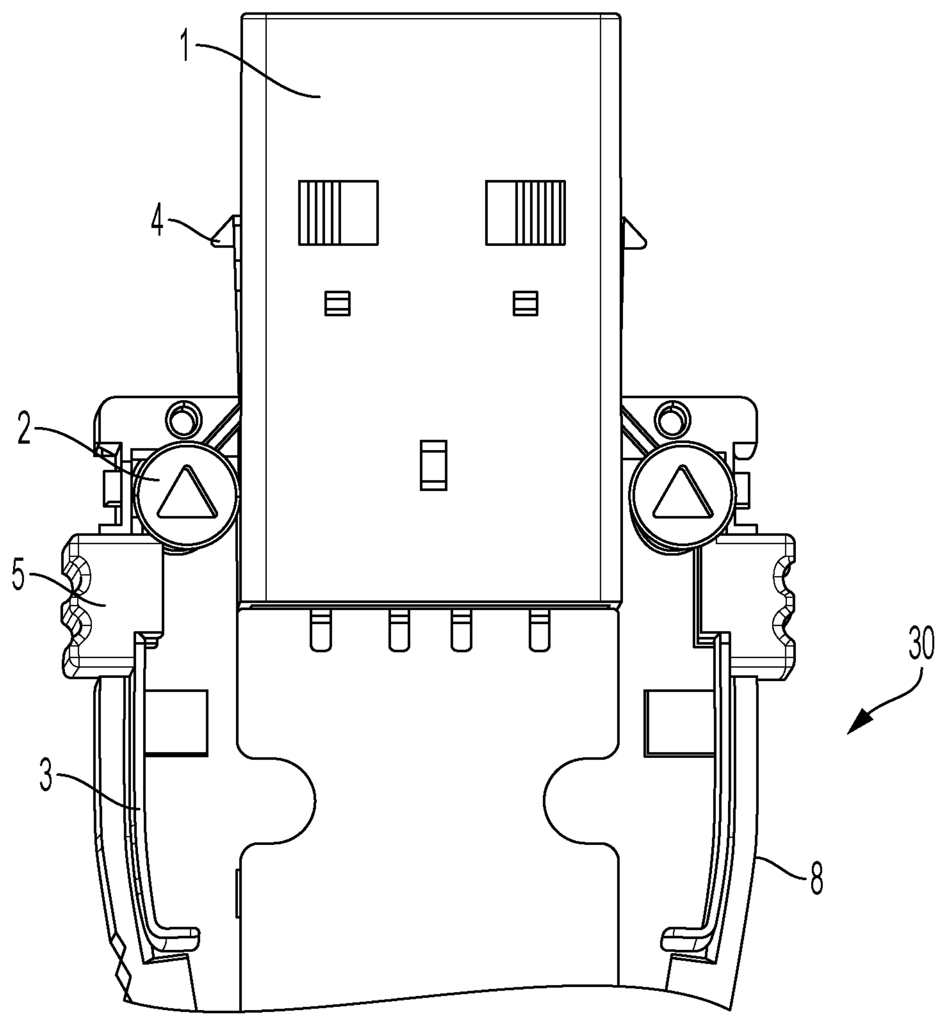
FIG. 1 is a sectional view of a distal portion of the L-shaped head of embodiment No. 1 of the current disclosure.

Referring to FIG. 1, an implementation example No. 1 of the disclosed system and anti-disassembly structure where components are marked by numbers, L-shaped head 30, 1: USB interface plug; 2: anti-disassembly screw; 3: resilient locking arm; 4: latch projection; 5: button or push kay.

Figure 2:
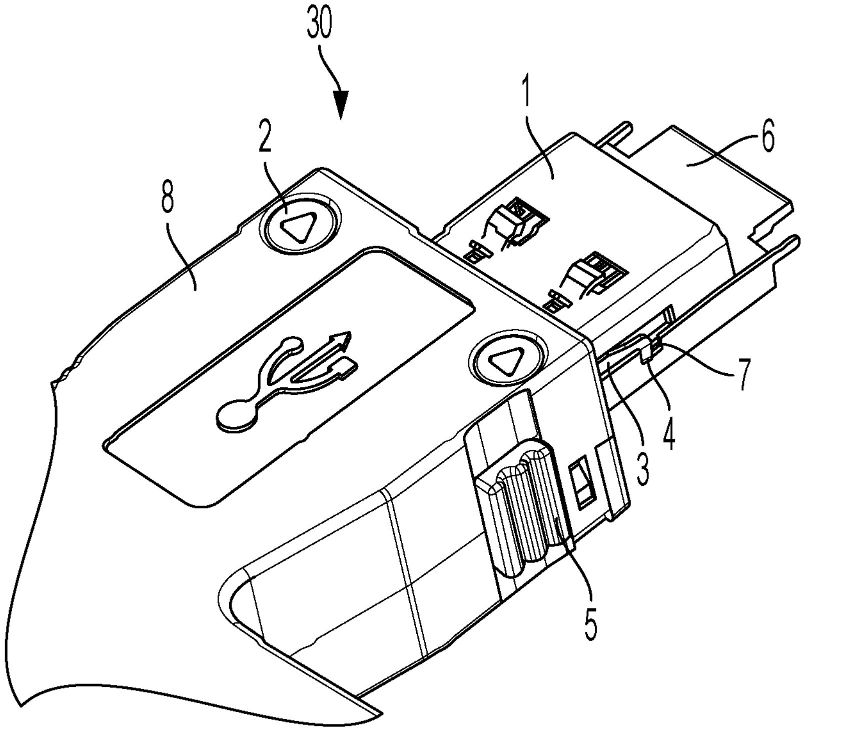
FIG. 2 is a perspective view of the L-shaped head of embodiment No. 1.

Referring to FIG. 2 the detailed profile of an implementation example No. 1 of the disclosed system and anti-disassembly structure where components are marked by numbers, L-shaped head 30, 2: anti-disassembly screw; 3: resilient locking arm; 4: latch projection; 5: button or push kay and 8: external shell of L-shaped head. FIG. 2 also shows 6: USB female slot of computer and 7: lock hole within USB female slot 6.

Figure 3:
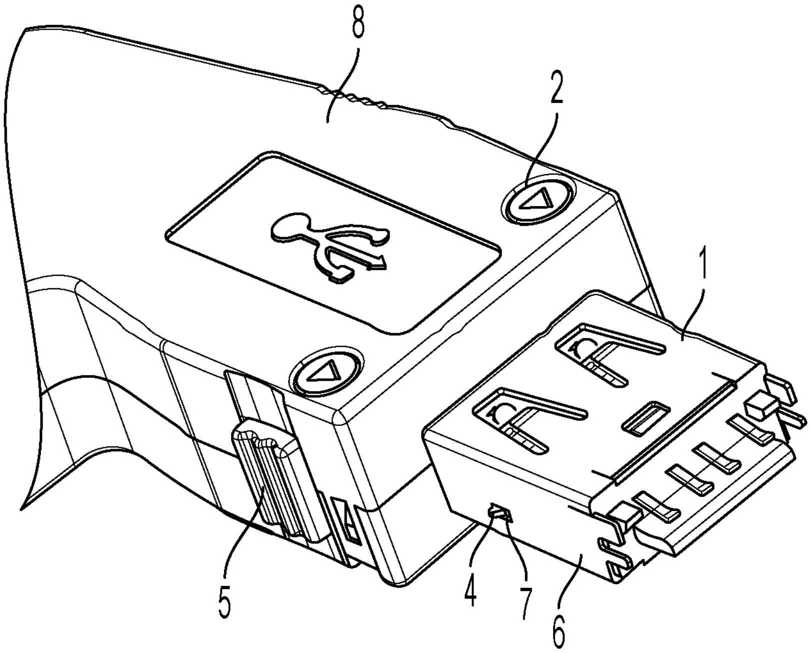
FIG. 3 is another perspective view of the L-shaped head of embodiment No. 1.

Referring to FIG. 3 the detailed profile of an implementation example No. 1 of the disclosed system and anti-disassembly structure, in which components are marked by numbers, L-shaped head 30, 4: latch projection; 7: lock hole of USB slot 6 of computer.

Figure 4:
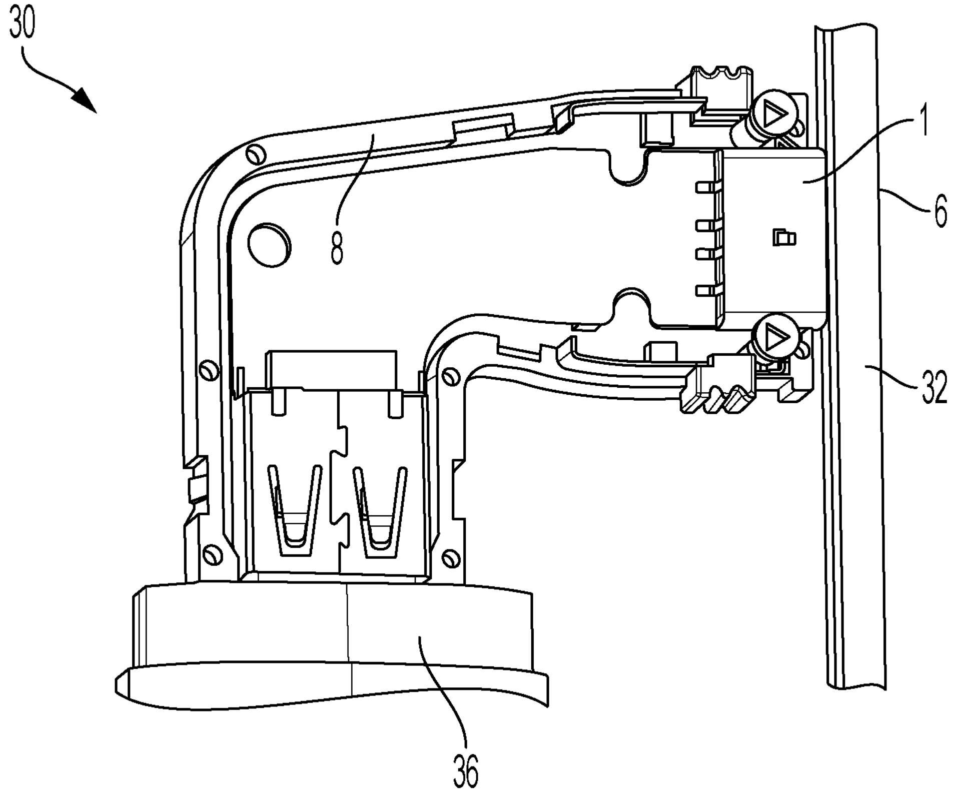
FIG. 4 is a detailed, sectional view of the L-shaped head of embodiment No. 1 connected between the protective dongle enclosure and the computing device.

Referring to FIG. 4 the L shaped connector head 30 with an implementation example No. 1 of the disclosed system and anti-disassembly structure which connects computer 32 at one end and a USB dongle 34 at the other end with secure lock.

Figure 5:
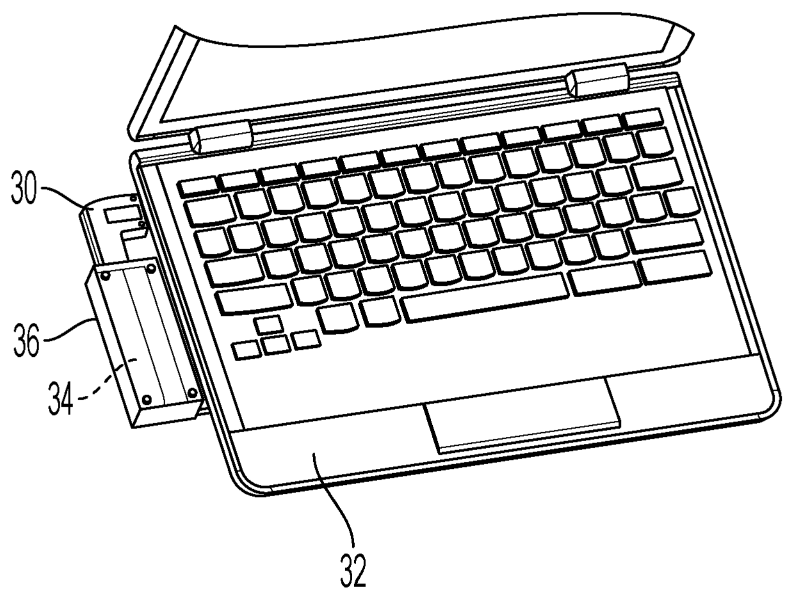
FIG. 5 is a perspective view of embodiment No. 1 mounted and connected to a laptop computing device.

Referring to FIG. 5 The L shaped connector head 30 with an implementation example No. 1 of the disclosed system and anti-disassembly structure providing secured connection between a computer 32 and a USB dongle 34 which is locked in a protective and tamper-resistant enclosure 36 with secure screws 2 (also referred herein as anti-theft screws or anti-disassembly screws), and the whole structure is attached to the side of computer 32 firmly.

As shown, the L-shaped connector head 30 extends out from the enclosure 36 in parallel with the side of the computer 32 and then turns in substantially a right angle towards the computer 32 so that the USB plug 1 interfaces with (i.e., plugs into) the USB port 6 in the side of the computer 32. The L-shaped head 30 includes appropriate circuitry, wiring, interfaces, and the like to provide a data and power connection between the dongle 34 and the USB plug 1.

As shown in FIGS. 1-5, the plug 1 on the external device can be inserted into the computer's socket (USB port) 6 to form a communication/electrical connection. The anti-disassembly structure also includes a long, strip-shaped resilient locking arm 3, with the back end fixed to the side of the plug 1 and the front end protruding outward with a latch projection 4 (acting as an outwardly biased latch) as shown in FIG. 2. When the plug 1 is inserted in the computer's USB port 6, the resilient locking arm 3 is inserted into the corresponding slot on the side of the socket 6 along with the plug 1, and the front end of the resilient locking arm bends inward and the latch projection 4 extends into the lock hole 7 on the side of the slot 6 to make interface locked. The L shaped connector providing secured connection between a computer and a USB dongle which is locked in an enclosure with secure screws. The whole structure is attached to the side of computer firmly.

Referring specifically to FIG. 3, the two symmetrical inner walls of the L-shaped shell 8 approximate the plug end are equipped with elongated resilient locking arms 3, and the direction of the length of the resilient locking arms is parallel to the axis of the plug 1. The resilient locking arms 3 are made of preferably resilient (i.e., spring-like) clastic materials. The rear end of the resilient locking arm is fixed to the inner wall of the shell 8, and the resilient locking arm is located on the side of the plug 1, with a spacing between the front end of the resilient locking arm and the plug.

The front end of the locking arm 3 extends from the front opening of the L-shaped shell 8, and the outer surface of the front end of the locking arm 3 is provided with an outwardly protruding elastic corner 4 which operates as a biased latch when engaged with lock hole 7 in the computer's USB socket 6. As a preferred option, the front end of the latch projection 4 is chamfered and transitioned with a circular arc, which is more convenient for inserting and removing the locking arm 3.

On both sides of the computer USB socket 6, there are straight slots corresponding to the front end of the locking arm 3 and lock holes 7 corresponding to the latch projections 4.

In reference to FIG. 2 and FIG. 3, the 2 resilient locking arms 3 are located at each side of the USB plug 1, when the USB plug 1 is inserted into the computer socket 6, the two lock plates on its sides are forced by the walls of the socket 6 to bend inward and be close the space with the plug 1, and simultaneously insert into the two corresponding slots on the side of the socket 6. In this process as the plug 1 is being inserted into the socket 6, the elastic latching projection 4 will extend into the lock hole 7 and hook onto it when the latching projection 4 progresses into the socket 6 and over the lock hole 7. In this position, the resilient locking arms 3 return to their original position biasing the latching tip in the lock hole 7, thus completing the locking.

As an anti-disassembly component, this embodiment also includes holes for anti-disassembly screws 2, and the anti-disassembly screws are existing triangular anti-theft screws. The internal thread of the hole is located inside the shell 8, and the upper end surface of the shell has an opening for the anti-disassembly screws to be screwed in. The bottom of the hole is located on the inner wall of the lower end surface of the shell (non-penetrating). After the anti-disassembly screw is screwed into the hole through the opening, the side wall of the anti-disassembly screw 2 can push against the inner side of the lock arm 3, thus preventing the lock arm 3 from bending inward and retaining the latch projection 4 to its locket state. As a result, the external device is fixed to the computer and cannot be removed.

Furthermore, the lock arms 3 are provided with buttons 5 that can be pressed inward by fingers during disassembly, and the buttons are located inside the button openings on the two side walls of the shell. Special tools, such as a matching triangular screwdriver, are required to remove the anti-disassembly screws 2. After the screws 2 have been removed, the two buttons 5 may be pressed inward by the user's fingers to push the lock arms 3 inwardly and cause the latch projections 4 exit the lock holes 7 in the USB slot 6. Consequently, while the buttons 5 are pressed in by a user (causing the latch projections to exit the lock holes), the plug 1 may be removed from the socket 6. The structure of this embodiment can prevent the plug 1 from being arbitrarily pulled out and has the effect of anti-theft and anti-disassembly.

The anti-disassembly structure has a L shaped section, as shown in FIG. 4, that connects the front and back sections and extends inward. The L shaped section is located at the top corner of the outer casing, and the hole is located on the inner side of the L shaped section. The L shaped section allows the front section to be positioned further inward than the back section, saving space and reducing the width of the structure at the plug-in port, making the computer more compact. The L shaped connector, as shown in FIG. 4, with the one end to be connected to a USB dongle and the other end to be connected to computer with secure lock as shown in FIG. 5.

The FIG. 4 and FIG. 5 display an implementation example No. 1 of the disclosed system and anti-disassembly structure providing secured connection between a computer and a USB dongle which is locked in an enclosure with secure screws, and the whole structure is attached to the side of computer firmly. A difference between the prior art dongle may be seen by comparing the prior art dongle in FIG. 18B with the embodiment No. 1 in FIG. 5.

Figure 6:
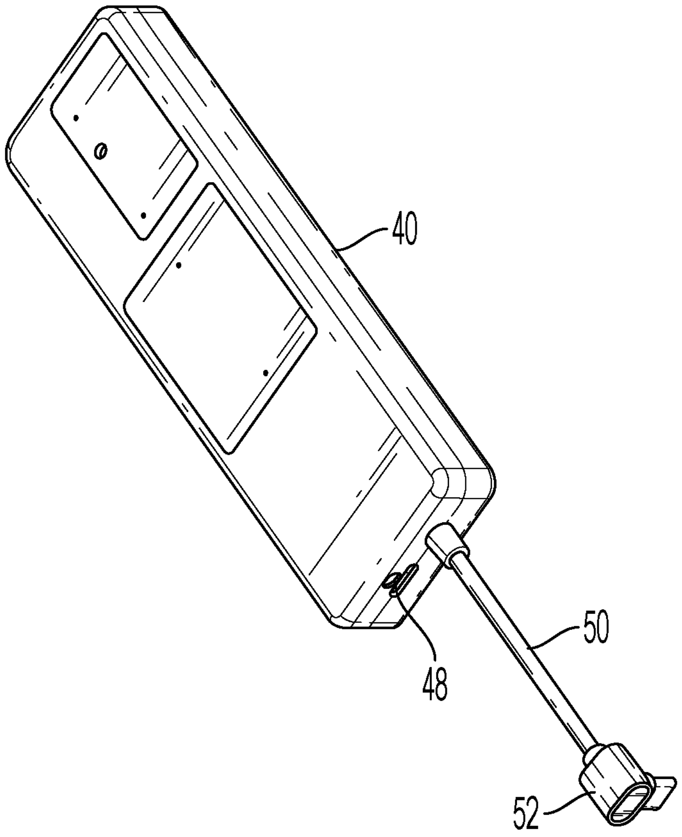
FIG. 6 is a perspective view of embodiment No. 2 according to the present disclosure.
Figure 7:
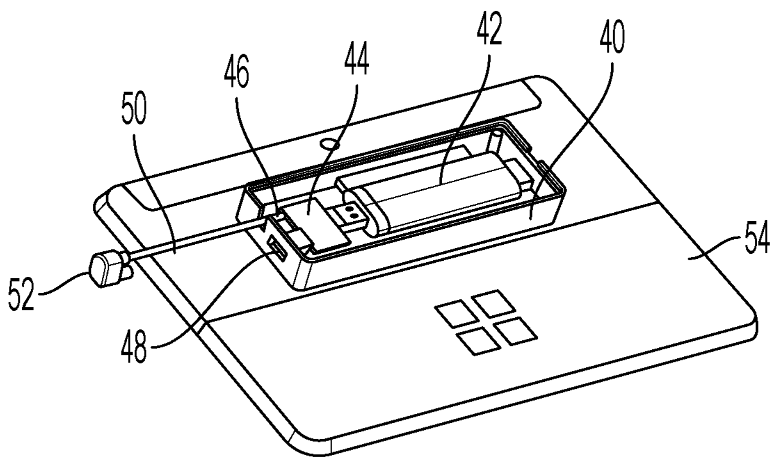
FIG. 7 is a detailed view of embodiment No. 2 mounted to a computing device.

FIGS. 6, 7,8, and 9 show an embodiment No. 2 of this disclosure. In this embodiment, system and structure is designed with an enclosure 40 shown in FIG. 6. Inside the enclosure is a USB type A dongle 42, and a circuit board 44 which is designed to split a USB type A interface into two, one interface 46 for data communication with computer via type C interface and the other interface 48 for charging the computer (or providing a charge for a connected device). This is especially advantageous for certain computer models that no longer have a dedicated charging port, but rather use a USB type-C port for both data transmission and charging (similar to some smartphone designs). A USB type C L-shaped male connector 52 with cable 50 is connected in the data interface 46 as shown in FIG. 7. The circuit board 44 is designed to split a USB type A interface into two, one for data communication with computer via type C interface and the other for charging. An enclosure 40 is securely mounted on laptop computer 54 in FIG. 8, a type C charging cable 56 is connected to the charging port 48 at one end, and a power source (not shown) at the other end in FIG. 9.

As shown in FIG. 6, the implementation embodiment No. 2 of the disclosed system and structure is designed with an enclosure, inside it has a USB type A dongle 42, a circuit board 44, a USB type C L shaped male connector 52 with cable 50, and a charging interface 48.

As shown in FIG. 7, the implementation embodiment No. 2 of the disclosed system and structure with detailed inside view of the enclosure 40, a USB type A dongle 42, a circuit board 44 which has a female USB interface to connect to USB dongle 42, supports functionality of splitting data path and charging path with corresponding 2 interfaces provided by the enclosure, one 46 for data communication with computer via type C interface and the other 48 for charging.

FIG. 8 provides multiple views of embodiment No. 2 as mounted to a computing device 54. FIG. 8A is a front view, FIG. 8B is a top view, FIG. 8C is a bottom view, FIG. 8D is a left side view and FIG. 8E is a right-side view.

FIG. 8 provides an implementation example of embodiment No. 2 of the disclosed system and structure with full view of the enclosure 40 securely mounted on laptop computer 54, charging port 48, an extension cable 50 with USB type C L shaped connector 52 to connect to laptop computer type C port. As shown best in FIG. 8B the L-shaped connector allows for secure connection to the computer's USB port by flipping the facing direction of the male USB connection about 180° from the direction of the cable 50 extension along the back of the computer 54 from the enclosure 40.

FIG. 9 provides an implementation example of embodiment No. 2 of the disclosed system and structure with example view of the enclosure supporting charging, an enclosure 40 is securely mounted on laptop computer 54, a type C charging cable 56 connected to the charging port 48 at one end, and a power source at the other end. The enclosure 40 top cover is designed to ensure dongle is not visible by user, and to firmly close the enclosure 40 securely with 4 anti-disassembly screws 41.

The embodiment No. 2 of the solution is designed to use an enclosure 40 containing a dongle 42 and interfaces 46/48 and mounted on laptop computer 54. The disclosed system and structure provides an integrated dongle 42 and circuit inside the enclosure, i.e., a USB type A dongle, a circuit board 44 which has a female USB interface to connect to USB dongle, supports functionality of splitting data path and charging path with corresponding 2 interfaces implemented on the enclosure, one 46 for data communication with computer via type C interface and the other 48 for charging. The enclosure 40 is closed firmly by a cover with four anti-disassembly screws 41. The structure is securely mounted on back of computer 54. A difference between the prior art dongle may be seen comparing the prior art dongle in FIG. 18B with the embodiment No. 2 in FIG. 9.

FIGS. 10,11A, 11B, 12A and 12B show an embodiment No. 3 of the disclosed system and structures. In this embodiment, the disclosed system and structure is integrated with a computer protection case 60 as shown in FIG. 10, the case has a USB type A dongle 62 in a dongle hosting chamber 63, a circuit board (or circuit) 64, and a USB type C L shaped male connector 66 as shown in FIGS. 11A and 11B. The case 60 is securely attached to a laptop computer 68, displayed in FIGS. 11B and 12B to ensure undisrupted wireless connection and to achieve anti-tamper objectives. In this embodiment No. 3, the circuit board 64 provides a USB type A to type C conversion circuit.

In other words, the embodiment No. 3 of the solution is designed to use an external protection case 60 with integrated a USB type A dongle 62, a circuit board, and a USB type C L shaped male connector 66. As shown best in FIG. 10 the L-shaped connector allows for secure connection to the computer's USB port by flipping the facing direction of the male USB connection about 180° from the direction of the cable extension along the back of the computer. The dongle and associated circuit are designed not to be visible by user. A difference between the prior art dongle may be seen by comparing the prior art dongle in FIG. 18B with the embodiment No. 3 in FIG. 12B.

FIG. 10 shows implementation example of embodiment No. 3 of the disclosed system and structure is designed with a protection case 60, it has a USB type A dongle 62, a circuit board 64, a USB type C L shaped male connector 66. The dongle and associated circuit are designed not to be visible by user.

FIGS. 11A and 11B illustrate the implementation example of embodiment No. 3 of the disclosed system and structure with detailed view of the protection case 60. The computer case 60 is specially designed to host a USB type A dongle 62 as shown, and a type A to type C connector 66 with cable 65. The case is securely attached to a laptop computer 68 to ensure undisrupted wireless connection and dongle hosting chamber 63 is at bottom part of the protection case 60 as shown in FIG. 11B.

FIGS. 12A and 12B illustrate the implementation example of embodiment No. 3 of the disclosed system and structure with detailed view of the protection case 60. The case is specially designed to host a USB type A dongle 62 and a type A to type C connector 66 with cable 65. The case 60 is securely attached to a laptop computer 68 to ensure undisrupted wireless connection and dongle hosting chamber 63 is at top part of case as shown in FIG. 12B.

FIGS. 13A-D show an embodiment No. 4 of the disclosed system and structures, which is a protection case 70 for a series of computers. As it is displayed in FIG. 13A, the protection case 70 provides an enclosure 72 for a USB type A dongle 74 and a circuit board 76. The circuit board 76 is designed to split a USB type A interface into two, one for data communication with computer via type C interface and the other for charging. The embodiment includes a USB type C L-shaped male connector 78 with cable 79 and a USB type C charging interface 80 shown in FIG. 13B. The dongle 74 and associated circuit board 76 are designed not to be visible by user and hosted inside a chamber 72 that is fixed to or integrated with the protection case 70. A cover plate 82 is provided on the interior of the protection case 70 over the enclosure 72 to enclose the dongle 74 and circuit board 76 therein. The cover may be firmly fixed with the protection case 70 using anti-disassembly screws as 84 shown in FIG. 13D.

The implementation embodiment No. 4 of the disclosed system and structure is designed with a protection case 70 for series of computers, as it is displayed in FIG. 13A, it encloses a USB type A dongle 74 and a circuit board 76. The circuit board 76 is designed to split a USB type A interface into two, one for data communication with computer via type C interface 78 and the other interface 80 for charging. The USB type C interface 78 includes an L shaped male connector. The charging interface 80 is a USB type C charging interface shown in FIG. 13B. The dongle 74 and associated circuit board 76 are designed not to be visible by user, and hosted inside a chamber 72 which is firmly fixed with the protection case 70 using anti-disassembly screws 84 as shown in FIGS. 13C and 13D. A difference between the prior art dongle may be seen by comparing the prior art dongle in FIG. 18B with the embodiment No. 4 in FIG. 13C.

FIGS. 13E-F show an alternate of embodiment No. 4. In this alternate embodiment, charging case 70' includes an enclosure 72' that is slightly longer (closer to the edge of the computer with the data port) so that cable 79' may also be shorter. In addition, a connector enclosure 86 is provided to protect the connection between connector 78 and associated computer data port. The connector enclosure 86 includes a first extent 87 along the back surface of the case 70' that extends out over the connector 78 (that is inserted in the data port) and includes holes for securing the connector enclosure to the back surface using security screws 88. The connector enclosure 86 also includes a second extent 89 extending perpendicular to the extent 87 to correspondingly cover the portion of the connector 78 extending perpendicularly from the bottom of the computer (resulting in a connector enclosure 86 have an L-shape).

FIGS. 14A and B provide an implementation embodiment No. 5 of the disclosed system and structure designed with a protection case specially for iPad series of computers. Concepts used in embodiments No. 3 and No. 4 are equally applied to iPad. As it is displayed in FIG. 14A and FIG. 14B, the protection case 90 provides and enclosure/chamber 92 for a USB type A dongle (not shown) and a circuit board (not shown). The enclosure 92 includes a USB type C L shaped male connector 94 and a USB type C charging interface 96. The dongle and associated circuit are designed not to be visible by user and hosted inside a chamber 92 which is firmly fixed with the protection case 90 using anti-disassembly screws (or otherwise fixed or integrated in a tamper-resistant manner). A difference between the prior art dongle may be seen by comparing the prior art tablet (e.g., iPad) dongle in FIG. 18C with the embodiment No. 5 in FIG. 14B.

Embodiment No. 6 of the solution is designed with a protection case as with embodiments Nos. 3, 4 or 5, where the case is specially designed to have an integrated USB type A dongle, a type A to type C connector with cable. For this embodiment No. 6 a wireless charging pad 100 as shown in FIG. 15 is integrated to the protection case to add wireless charging capability.

FIGS. 16A and 16B provide an implementation embodiment No. 7 of the disclosed system and structure with which a computer stand 110 includes a fixed or integrated chamber 112 (shown as transparent in FIG. 16A) that is specially designed to enclose a USB type A dongle 114 and to provide a type A to type C connector 116 with cable 118, when the computer 120 is securely attached to the stand 110 and thus provide secure, uninterrupted, anti-tamper, anti-disassembly cellular communication links between computers and networks. The implementation example No. 7 of the disclosed system and structure with which is the computer stand 110 integrated with an enclosure 112, as it is displayed in FIG. 16A and FIG. 16B, the stand encloses a USB type A dongle 114, and a circuit board 115; and provides a USB type C L shaped male connector 116 and a USB type C charging interface 119. The dongle 114 and associated circuit 115 are designed not to be visible by user and hosted inside the enclosure 112 which is firmly integrated with the stand 110 using anti-disassembly screws (for example). When the computer 120 is securely attached to the stand 110 and thus a secure, uninterrupted, anti-tamper, anti-disassembly cellular communication links between computers and networks is established. FIG. 16C provides a comparison of the prior art computer stand and dongle with the embodiment No. 7 in FIG. 5.

The implementation embodiment No. 8 of the disclosed system and structure is designed for laptop computer uses cases in harsh environments. Some examples include oil and gas field operations, mining sites, utility industry sites, and correctional facilities, where ruggedized computers with integrated cellular modem are standard configurations, especially for outdoor field operations. In addition to anti-tampering and anti-disassembling, much higher reliability standards like waterproof, moisture resistance, shocking resistance, dropping protection, and so on, are often required. An example ruggedized laptop computer is shown in FIG. 17A. A computer meeting these types of requirements are often expensive to build and to buy by end users.

In this No. 8 embodiment, a protection case is designed with similar ruggedization standard to that of typical ruggedized computer as displayed in FIG. 17A. Examples of the embodiment, most importantly, may enclose a USB type A dongle 74' and a circuit board 76', similar to the example shown in FIG. 13A. FIG. 17B provides a top view of an example ruggedized case with integrated cellular dongle when the case is installed with a regular WiFi cable laptop.

FIG. 17C and FIG. 17D provide, respectively, a side view and a bottom view of embodiment No. 8. The details of the dongle implementation are similar to what is described in FIG. 13B, FIG. 13C, and FIG. 13D, in which the circuit board 76' is designed to split a USB type A interface into two. One may provide data communication with computer via type C interface 78' and the other may provide an interface 80' for charging. The USB type C interface 78' may include an L-shaped male connector. The charging interface 80' is a USB type C charging interface shown in FIG. 13B. The dongle 74' and associated circuit board 76' are designed to not be visible by user, and may be hosted inside a chamber 72', which is firmly fixed with the protection case 70' using anti-disassembly screws 84', as further shown in FIGS. 13C and 13D. The key difference is a ruggedized computer case with integrated cellular dongle. A significant advantage of embodiment No. 8 is that it provides a cost-effective solution for a ruggedized computer user who, instead, can simply use regular computer protective case.

While the current disclosure provides details of several exemplary embodiments for a protective and tamper resistant structures for a computer dongle, it is to be understood that the current disclosure is not limited to the disclosed embodiments and that modifications may be made without departing from the scope of the invention as claimed. For example, while disclosed embodiments describe protective and tamper resistant structures for USB dongles, it is to be understood that the current disclosure is not limited to USB dongles as other computer/appliance/machine interfaces may be provided (e.g., Lightning interface, HDMI interface and the like) or developed in the future. Further, it should be understood that the current disclosure is not necessarily limited to computer dongles, as the disclosed concepts and structures can be applied to dongles utilized with other forms of appliance and/or machine interfaces.

What is claimed:

1. A protective and tamper resistant structure for a computer dongle comprising:

a protective enclosure providing a chamber for enclosing a computer dongle therein including a dongle interface for insertion of a dongle plug therein;

a computer interface plug extending from the protective enclosure and adapted to be plugged into an interface port on a computer;

an electrical connection between the dongle interface and the computer interface plug, the electrical connection configured to provide a data and power connection between the computer dongle and the computer interface plug when the computer dongle is plugged into the dongle interface; and a cable extending from the protective enclosure and having a cable direction;

wherein the computer interface plug is directed about 180 degrees relative to the cable direction; and wherein the dongle interface is adjacent to the cable.

2. The protective and tamper resistant structure of claim 1, further comprising a connector enclosure adapted to be mounted over the computer interface plug and computer port in a tamper-resistant manner.

3. The protective and tamper resistant structure of claim 1, further comprising a cover plate for enclosing the computer dongle within the protective enclosure that is secured in place in a tamper-resistant manner.

4. The protective and tamper resistant structure of claim 1, wherein the tamper-resistant mounting or securing is accomplished using secure screws.

5. The protective and tamper resistant structure of claim 1, further comprising circuitry within the protective enclosure for converting the dongle interface from a first interface type to a second interface type.

6. A protective and tamper resistant structure for a computer dongle comprising:

a protective enclosure providing a chamber for enclosing a computer dongle therein including a dongle interface for insertion of a dongle plug therein;

a computer interface plug extending from the protective enclosure and adapted to be plugged into an interface port on a computer;

an electrical connection provided between the dongle interface and the computer interface plug, the electrical connection configured to provide data and power connection between the computer dongle and the computer interface plug, when the computer dongle is plugged into the dongle interface; and circuitry within the protective enclosure for splitting the dongle interface into (a) a data interface electrically connected to the computer interface plug and (b) a charging interface electrically connected to a separate connector or port;

wherein the protective enclosure is at least one of: (a) a separate structure mounted to the computer in a tamper-resistant manner, (b) fixed to or integrated with a protective computer cover, or (c) fixed to or integrated with a computer stand.

7. The protective and tamper resistant structure of claim 6, further comprising a connector enclosure adapted to be mounted over the computer interface plug and computer port in a tamper-resistant manner.

8. The protective and tamper resistant structure of claim 6, further comprising a cover plate for enclosing the computer dongle within the protective enclosure that is secured in place in a tamper-resistant manner.

9. The protective and tamper resistant structure of claim 6, wherein the tamper-resistant mounting or securing is accomplished using secure screws.

10. The protective and tamper resistant structure of claim 6, further comprising circuitry within the protective enclosure for converting the dongle interface from a first interface type to a second interface type.

11. A protective and tamper resistant structure for a computer dongle comprising:

a protective enclosure providing a chamber for enclosing a computer dongle therein including a dongle interface for insertion of a dongle plug therein;

a computer interface plug extending from the protective enclosure and adapted to be plugged into an interface port on a computer;

a cable extending from the protective enclosure terminating at the computer interface plug wherein the computer interface plug structure provides an interface for insertion into the computer port that is directed about 180° with respect to the direction of the cable extent; and an electrical connection provided between the dongle interface and the computer interface plug, the electrical connection configured to provide data and power connection between the computer dongle and the computer interface plug, when the computer dongle is plugged into the dongle interface;

wherein the protective enclosure is at least one of: (a) a separate structure mounted to the computer in a tamper-resistant manner, (b) fixed to or integrated with a protective computer cover, or (c) fixed to or integrated with a computer stand.

12. The protective and tamper resistant structure of claim 11, wherein the charging interface is provided on the protective enclosure adjacent to the cable.

13. The protective and tamper resistant structure of claim 11, further comprising a connector enclosure adapted to be mounted over the computer interface plug and computer port in a tamper-resistant manner.

14. The protective and tamper resistant structure of claim 11, further comprising a cover plate for enclosing the computer dongle within the protective enclosure that is secured in place in a tamper-resistant manner.

15. The protective and tamper resistant structure of claim 11, wherein the tamper-resistant mounting or securing is accomplished using secure screws.

16. The protective and tamper resistant structure of claim 11, further comprising circuitry within the protective enclosure for converting the dongle interface from a first interface type to a second interface type.

* * * * *